United States Patent
Cheng et al.

(10) Patent No.: US 8,005,684 B1
(45) Date of Patent: Aug. 23, 2011

(54) METHOD FOR ESTIMATING A USED VEHICLE'S MARKET VALUE

(75) Inventors: Jie Cheng, Plymouth, MI (US); Rose Peng, Canton, MI (US); Yi Lu, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2226 days.

(21) Appl. No.: 09/607,069

(22) Filed: Jun. 29, 2000

(51) Int. Cl.
*G06Q 10/00* (2006.01)
(52) U.S. Cl. ............... 705/1.1; 705/306; 708/134
(58) Field of Classification Search ............ 705/1.1, 705/306; 708/134
See application file for complete search history.

(56) References Cited

U.S. PATENT DOCUMENTS 5,978,776 A * 11/1999 Seretti et al. .............. 705/26

OTHER PUBLICATIONS

N.A.D.A. Web page, from Nov. 1999.*

* cited by examiner

*Primary Examiner* — Janice A. Mooneyham
*Assistant Examiner* — Michael J Fisher
(74) *Attorney, Agent, or Firm* — Raymond L. Coppiellie; Brooks Kushman P.C.

(57) ABSTRACT

A method for estimating a used vehicle's market value is disclosed. The method searches for a set of comparable vehicles in an existing historical database of used vehicles. Estimations of the used vehicles are established based on each comparable vehicle (neighbor) in the set of comparable vehicles by adjusting their resale value in accordance with the individual differences found between the neighbor(s) and the used vehicle whose market value is to be estimated/predicted (the target vehicle). Finally, a distance-weighted average of all such estimations is calculated to arrive at a market value estimation for the target vehicle.

18 Claims, 4 Drawing Sheets

US 8,005,684 B1

METHOD FOR ESTIMATING A USED VEHICLE'S MARKET VALUE

TECHNICAL FIELD

The present invention relates to methods for estimating/predicting a used vehicle's market value.

BACKGROUND ART

An accurate and efficient means for estimating/predicting used vehicle market value at the vehicle identification number (VIN) level using historical data has continually been pursued. Especially when large numbers of vehicles are involved, small errors in estimating used vehicle market value could translate large monetary losses.

Conventionally, the value of a used vehicle is estimated by performing database queries on vehicles having similar features, options and content and having known market values. Once the closest used vehicles are located, the estimated market value is determined by finding the average vehicle market value of the closest used vehicles located.

However, this conventional approach fails to deliver accurate estimations of vehicle market value because of its inability to adjust for vehicle differences at the VIN level. Moreover, many times the inconsistency in the criteria for selecting similar used vehicles further skews the market value estimate. Other methods include performing linear regression on historical vehicle data to determine relative market value and sensitivity of vehicle content on overall vehicle market value. However, there is no mechanism to apply to use linear regression to estimate a used vehicle's market value due to procedural difficulties and lack of accuracy when not combined with local neighbor search.

Accordingly, a need exists for a method for valuing used vehicles wherein the method accounts for vehicle variations at the VIN level.

DISCLOSURE OF INVENTION

In accordance with one aspect of the present invention, a method for determining a used vehicle's market value is provided. The method includes selecting a number of comparable vehicles to use to estimate the used vehicle's market value, evaluating an estimation accuracy of the number of comparable vehicles using a historical database of used vehicles whose market values are known, determining a used vehicle market value error for the number of comparable vehicles selected, determining if the error has improved from a previous error, wherein the previous error was generated using a different number of comparable vehicles, and estimating a used vehicle's market value using the number of comparable vehicles if the error has improved.

In accordance with another aspect of the present invention, the method further comprises selecting a target vehicle from a historical database of used vehicles whose market values are known.

In accordance with still another aspect of the present invention, the method further comprises comparing the comparable vehicles to the target vehicle to determine a distance between each comparable vehicle and the target vehicle.

In accordance with still another aspect of the present invention, the method further comprises adjusting the known market values of each of the comparable vehicles using the distance to arrive at an estimated used vehicle market value for the target vehicle.

In accordance with still another aspect of the present invention, the method further comprises computing a distance-weighted average of the estimated market values.

In accordance with still another aspect of the present invention, the method further comprises generating a market value estimation error based on a difference in the distance-weighed average of the estimated market values and the known market value of the target vehicle.

In accordance with still another aspect of the present invention, the method further comprises selecting a comparable vehicle from the historical database.

In accordance with still another aspect of the present invention, the method further comprises comparing the used vehicle to the comparable vehicles to determine a distance between each comparable vehicle and the used vehicle.

In accordance with yet another aspect of the present invention, the method further comprises adjusting the known market values of each of the comparable vehicles using the distance to arrive at an estimated used vehicle market value for the used vehicle.

In accordance with yet another aspect of the present invention, the method further comprises computing a distance-weighted average of the estimated market values.

In accordance with yet another aspect of the present invention, the method further comprises generating a market value estimation error based on a difference in the distance-weighed average of the estimated market values and the known market value of the used vehicle.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Accordingly, the present invention provides a method for estimating a used vehicle's Market value.

The method of the present invention may be referred to as a distance-weighted nearest neighborhood (DWNN) method. This method overcomes the difficulties of the prior art mentioned above by combining the use of global estimation using regression or neural networks with a local search mechanism, such as enhanced K-nearest neighbor.

The DWNN approach searches for a set of comparable vehicles which will be referred to as a neighborhood in an existing historical database of used vehicles. Estimations of the used vehicles are established based on each neighbor vehicle in the neighborhood by adjusting their resale value in accordance with the individual differences found between the neighbor(s) and the used vehicle whose market value is to be estimated/predicted (the target vehicle). Finally, a distance-weighted average of all such estimations is calculated to arrive at a market value estimation for the target vehicle.

The neighborhood is a subset of vehicles selected from the historical database wherein each vehicle satisfies a predefined set of neighbor constraints. Typical neighbor constraints are certain key vehicle features, such as model, series; and model year. Of course, the neighbor constraints may be modified to increase or decrease the number of vehicles in the neighborhood.

The number of neighbors (hereinafter referred to as K) is controlled to provide the most accurate estimation of market value as possible. One objective of the present invention is to select the best value for K such that an estimation error is minimized while allowing the largest number of vehicles (coverage) to be accurately estimated. However, the estimation error cannot be derived from the set of target vehicles since the resale values of the target vehicles are undetermined. The DWNN process uses a neighborhood derived from the historical database and a historical database target vehicle (HDT vehicle) as surrogates for the target vehicles to determine the estimation error. The number of neighbors (K) is initially set to one and then incremented thereafter. For each increment of K, the estimation error and a coverage constraint are checked against the previous values. The coverage constraint is generally expressed in terms of a percentage. Coverage is calculated by dividing the number of vehicles whose market value have been estimated by the total number of vehicles whose market value were requested to be estimated. Finally, the method terminates and returns the estimated used vehicle market value calculated using the last value of K, when the estimation error has increased since the previous estimation error or if the coverage constraint cannot be satisfied with the current value of K.

Figure 1:
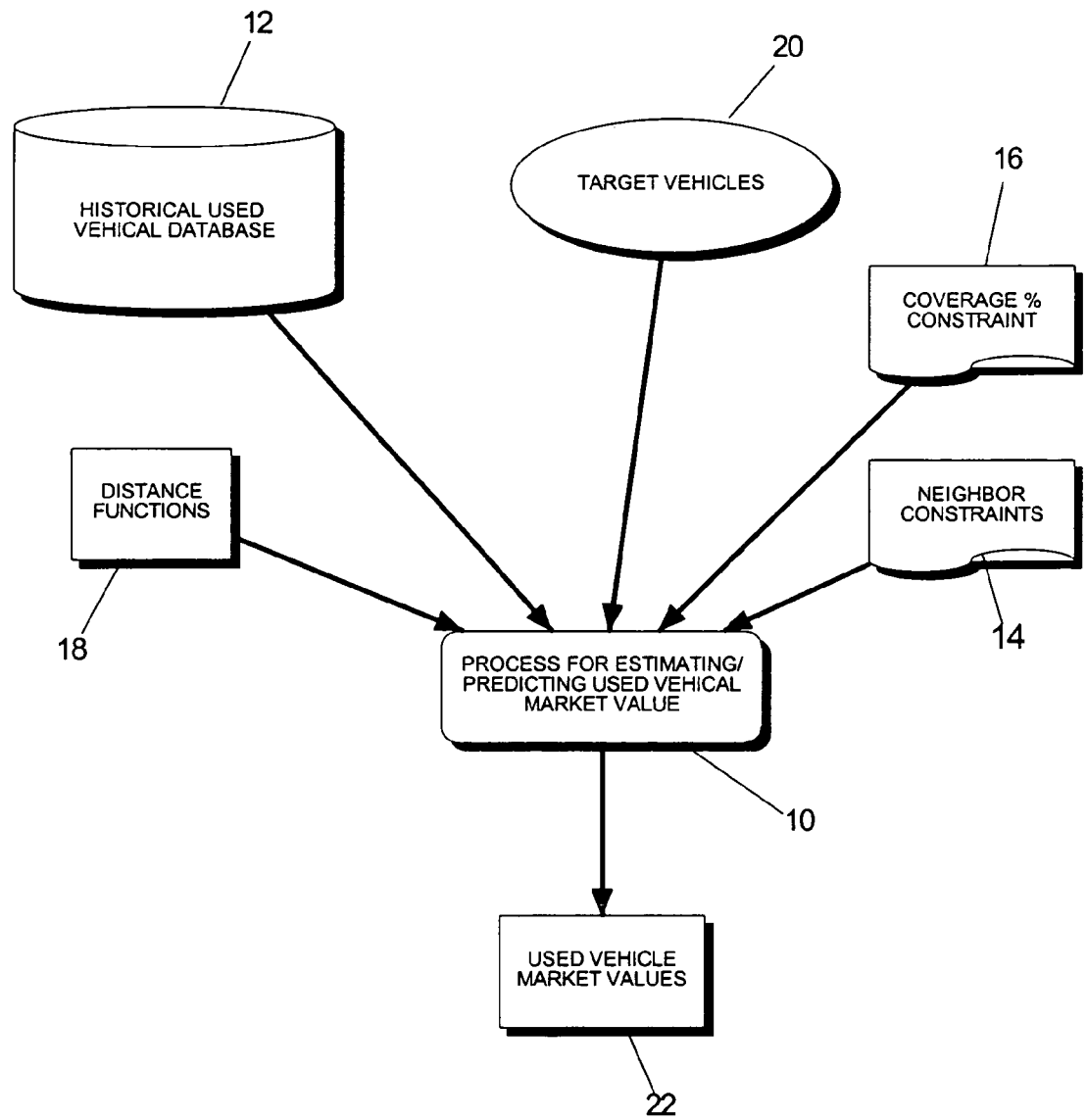
FIG. 1 is a schematic diagram of the process for estimating a used vehicle's market value, in accordance with the present invention.

Referring now to FIG. 1, an schematic diagram of inputs and outputs of the DWNN method for estimating a used vehicle's market value is illustrated, in accordance with the present invention. DWNN process 10 requires the following inputs: (1) a historical database of used vehicles 12; (2) a set of neighbor constraints 14 or maximum acceptable differences for a pair of vehicles to be considered neighbors; (3) a coverage constraint percentage requirement 16; (4) a plurality of neighborhood distance functions 18; and (5) a set of used vehicles (target vehicles) 20 whose market value is to be estimated/predicted. The output of the DWNN method is a set of used vehicle's market values 22.

The historical database 12 includes a plurality of records which include a complete description of all the features and contents of each used vehicle, such as vehicle type, model, series, trim level, engine type, transmission type, moon roof equipped, leather, and interior/exterior color. Further, each record in historical database 12 contains information regarding the resale of the used vehicles, such as a resale date, region, mileage, condition, resale channel, and resale price.

Neighbor constraints 14 are constraints, such as the vehicle must be the same model and make, model year, and vehicle series, and the difference in mileage must be less than 3,000 miles. The coverage percentage constraint 16, as described above, ensures that the market values for the largest number of target vehicles are being accurately estimated. The distance functions 18 are formulas which map or correlate a difference in features or vehicle contents between the pair of vehicles to an amount of used vehicle resale value. For example, a difference of 1,000 miles between two vehicles equates to a difference of $75.00 in resale value, and a difference in a vehicle having a moon roof and a vehicle that does not have a moon roof may be determined using the distance function to equate to a resale value difference of $400.00. The set of used vehicles (target vehicles) 20 whose market value is to be determined contains detailed descriptions of the features and contents of each used vehicle including the vehicle's intended resale time, region and resale channel. Of course, the resale plan information is not mandatory but is helpful for arriving at a more accurate market value estimation. The vehicles contained in used vehicle set 20, for ease of explanation, will be referred to as target vehicles.

Figure 2:
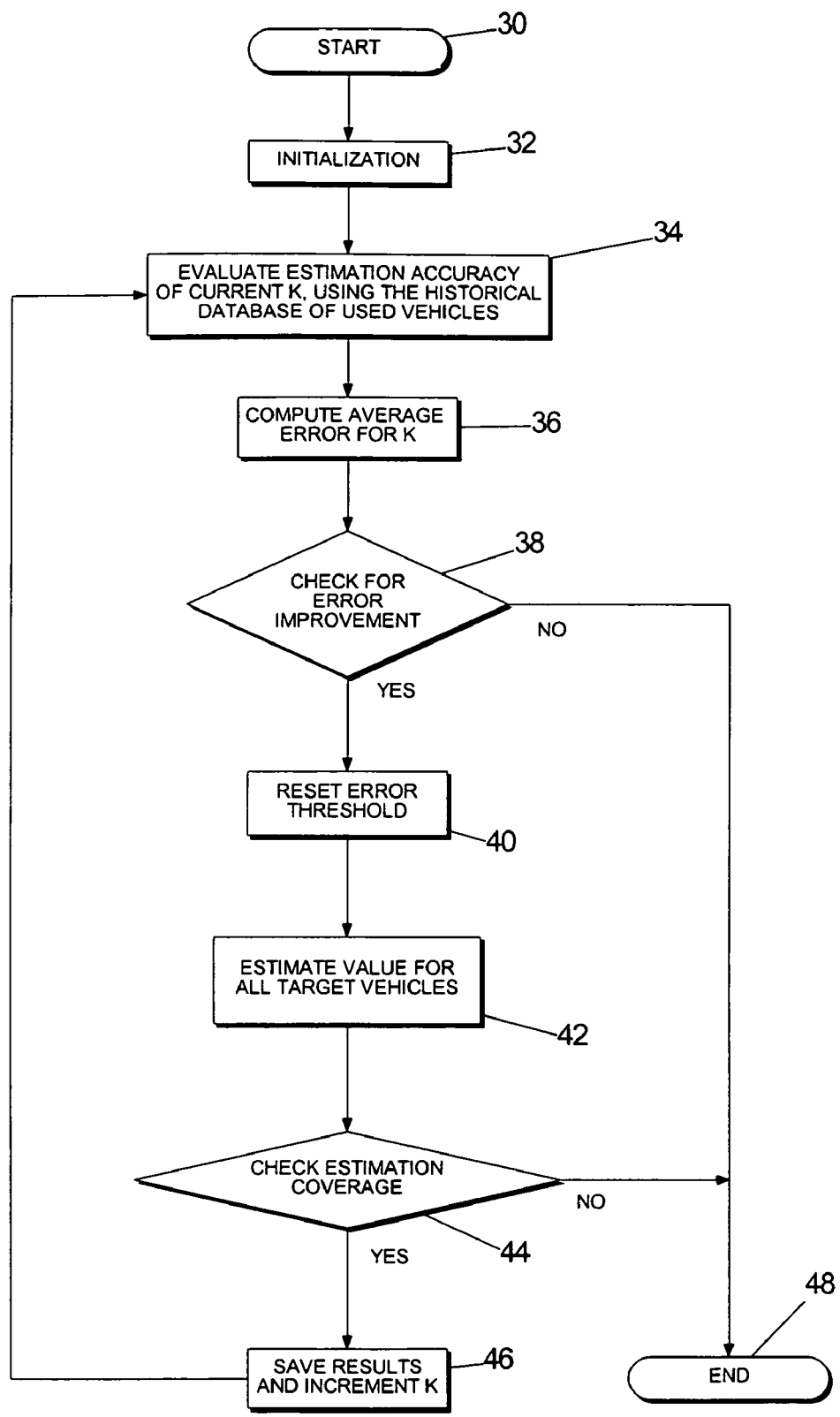
FIG. 2 is a flowchart illustrating the method for estimating a used vehicle's market value, in accordance with the present invention.

Referring now to FIG. 2, a flowchart illustrating the method for estimating a used vehicle's market value is illustrated, in accordance with the present invention. The method starts at an initialization step where previous error is set to a large number, such as 100,000 and where the number of neighbors (K) is set to 1, as represented in blocks 30 and 32. At block 34, the estimation accuracy of the current K value is evaluated using only the vehicles in the historical database 12. This step will be described in further detail hereinafter. At block 36 an average estimation error for the current K number of neighbors is computed by dividing the sum of errors for all vehicles in historical database 12 by the total number of vehicles in historical database 12. This generates the average estimation error associated with the current value of K. The computed average estimation error is assigned to a variable $error_K$. The average estimation error is checked for improvement, as represented by block 38. More specifically, it is determined whether $error_K$ is less than the previous error. If $error_K$ is less than the previous error, than the previous error is set equal to $error_K$, as represented by block 40. However, if $error_K$ is not less than the previous error, then the DWNN process is stopped and the market value estimations using the previous K are considered to be the most accurate values, as represented by blocks 38 and 48.

With continuing reference to FIG. 2, the method for estimating used vehicle market value is continued at block 42 where the market value for all target vehicles is estimated, in accordance with the present invention. This step will be described in further detail hereinafter. At block 44, the coverage percentage 16 is checked. More specifically, if the coverage percentage is less than the coverage percentage constraint 16, then the process is stopped and the used vehicle market values derived using the previous K are considered to be the most accurate market values. However, if the current coverage percentage is not less than the coverage constraint 16, the process continues at block 46. At block 46, the estimated/predicted target vehicle market values are stored in the used vehicle data set 22. The number of neighbors K is incremented by 1, and the method repeats itself as indicated by blocks 46 and 34.

Figure 3:
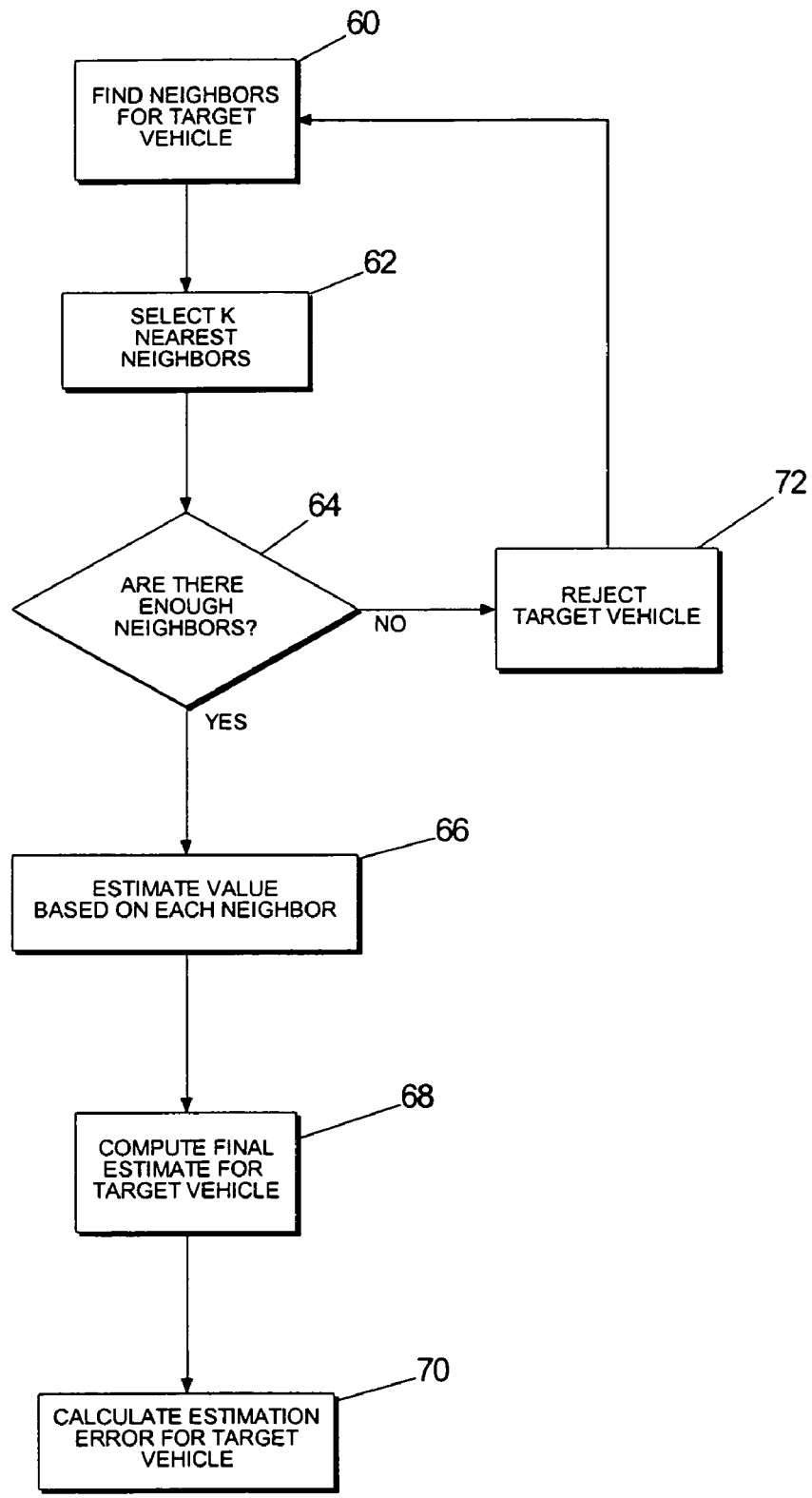
FIG. 3 is a flowchart illustrating the process for evaluating the estimation accuracy of the current number of comparable vehicles using the historical database, in accordance with the present invention.

Referring now to FIG. 3, a flowchart illustrating the additional steps involved in evaluating the estimation accuracy of the current K number of nearest neighbors using historical database 12 is illustrated, in accordance with the present invention. At block 60, all used vehicles in historical database 12, which satisfy the neighbor constraints 14 are located and saved. Using the distance functions 18, the distance between each neighbor vehicle is calculated, as represented by block 62. At block 64, the number of vehicles which were found to satisfy the neighbor constraints 14 are checked to determine if there are a K number of neighbors. If there are not a K number of neighbors available, then the target vehicle is rejected as not being predictable, as represented by blocks 64 and 72. Another target vehicle in the historical database 12 is then selected and the process repeats itself at block 60. However, if there are enough neighbors, then the process continues, as represented by block 66, where for each neighbor vehicle there is computed an estimation for the market value of the target vehicle by adjusting the known value of neighbor vehicle based on the distance function. At block 68, a distance-weighted average of all the adjusted known market value estimations is used to generate the final market value estimation for the target vehicle. For example, if there are three neighbors $v_1$, $v_2$ and $v_3$ and the distances are $d_1$, $d_2$ and $d_3$, respectively, then the weights for $v_1$, $v_2$ and $v_3$ are $W_1=D_1/(D_1+D_2+D_3)$, $W_2=D_2/(D_1+D_2+D_3)$, and $W_3=D_3/(D_1+D_2+D_3)$ where $D_1=(d_1+d_2+d_3)/d_1$, $D_2=(d_1+d_2+d_3)/d_2$ and $D_3=(d_1+d_2+d_3)/d_3$. Finally, at block 70, the estimation error for the target vehicle is calculated by taking the difference between the estimated value and the actual resale price for the target vehicle.

Figure 4:
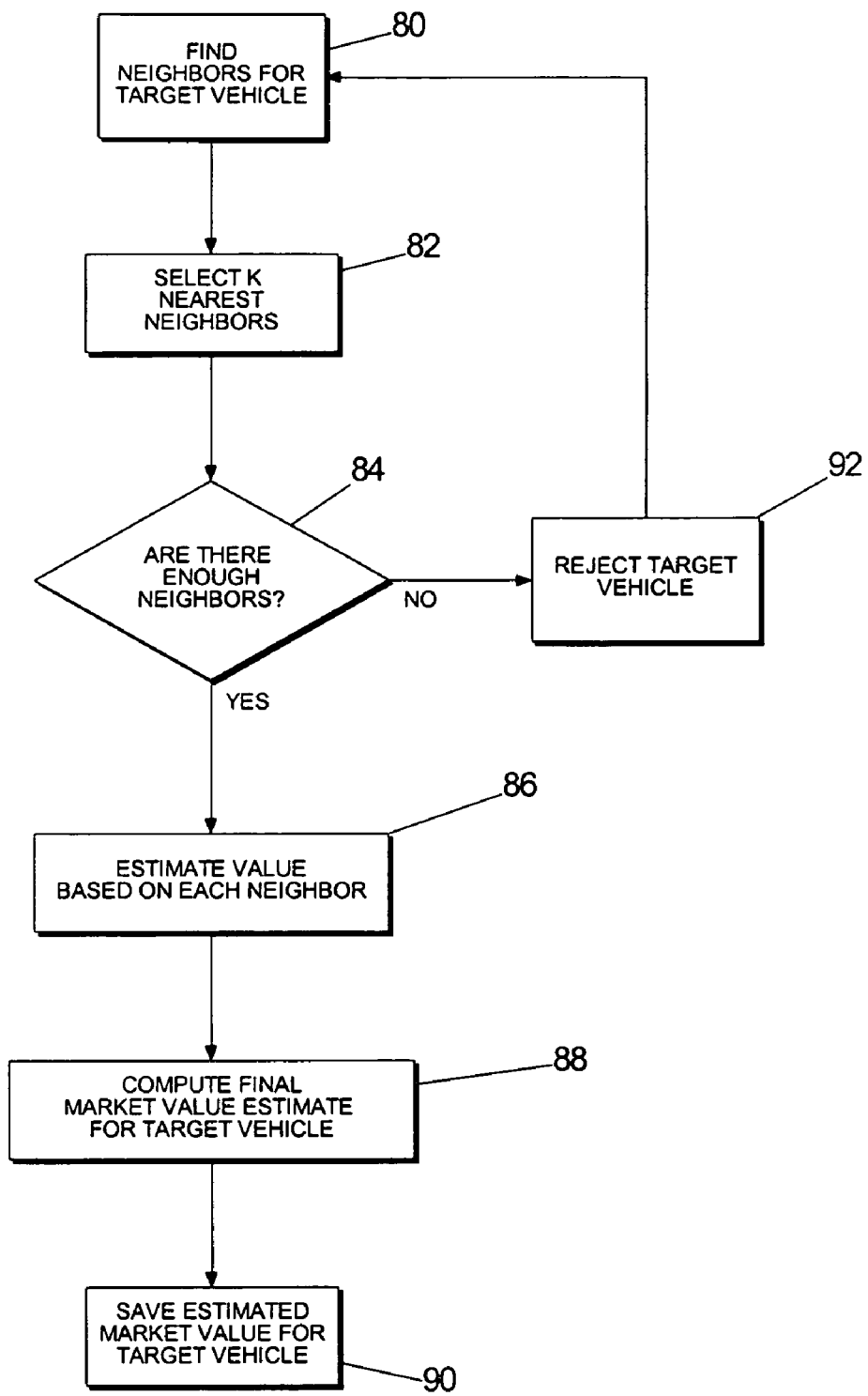
FIG. 4 is a flowchart illustrating the steps for estimating used vehicle market value for all vehicles in the course of the present invention.

Referring now to FIG. 4, a flowchart illustrating the steps for estimating the market value for all the used vehicles (target vehicles) 20 whose market value is unknown is illustrated, in accordance with the present invention. At block 80, all vehicles in the historical database 12 that satisfy the neighbor constraints 14 are found and segregated into a neighborhood subset. The distance between each neighbor vehicle in the neighborhood subset and the target vehicle whose market value is to be estimated is determined. However, only a K number of nearest neighbors in the neighborhood subset are selected based on the distances calculated, as represented by block 82. At block 84, it is determined whether there are enough neighbors to conduct a market value estimation. If there are not a K number of neighbors available, then the target vehicle is rejected and another target vehicle in used vehicles set 20 is selected, and the process repeats itself as represented by blocks 84, 92 and 80.

However, if there are enough neighbors, then a market value for the target vehicle is estimated for each neighbor vehicle in the neighborhood subset. The market value estimation is calculated by adjusting the value of each neighbor by a market value dollar amount determined using the distance function 18, as represented by block 86. At block 88, a distance-weighted average of all market value estimations are computed to generated a final estimation for the target vehicle. For example, in a similar manner as described above, if there are three neighbors $v_1$, $v_2$ and $v_3$ and the distances are $d_1$, $d_2$ and $d_3$, respectively, then the weights for $v_1$, $v_2$ and $v_3$ are $W_1=D_1/(D_1+D_2+D_3)$, $W_2=D_2/(D_1+D_2+D_3)$, $W_3=D_3/(D_1+D_2+D_3)$ where $D_1=(d_1+d_2+d_3)/d_1$, $D_2=(d_1+d_2+d_3)/d_2$ and $D_3=(d_1+d_2+d_3)/d_3$. Finally, at block 90, the target vehicle whose market value has been estimated is added to the used vehicle data set 22.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer-implemented method for estimating market value of a used vehicle, the method comprising:
    A) electronically receiving data from a nearest neighbor database consisting of a number K of used vehicle nearest neighbor records, each used vehicle nearest neighbor record comprising resale information and a plurality of used vehicle features, at least one target used vehicle record comprised of a plurality of used vehicle features, at least one constraint for determining a neighbor relationship between a pair of used vehicles, and a neighborhood distance function for determining a distance between a pair of used vehicles, the number K is iteratively selected for estimation accuracy based on a historical database of N used vehicle records; and
    B) electronically determining an estimated value for the at least one target used vehicle based on the data from the nearest neighbor database, the at least one target used vehicle record, the at least one constraint, and the neighborhood distance function,
    wherein the estimated value of the at least one target used vehicle is relied upon by individuals to at least price used vehicles for resale.

2. The method of claim 1, wherein determining step B) is comprised of:
    B1) for each used vehicle nearest neighbor record in the nearest neighbor database, determining a weighted estimated value for the used vehicle nearest neighbor based on the data from the nearest neighbor database, the at least one target used vehicle record, the at least one constraint, and the neighborhood distance function; and
    B2) determining an estimated value for the at least one target used vehicle based on the weighted estimated values for the number K of used vehicle nearest neighbors.

3. The method of claim 1, wherein the resale information includes at least one item selected from the group consisting of resale date, region, mileage, condition, and resale price.

4. The method of claim 3, wherein the plurality of vehicle features for each used vehicle nearest neighbor record and the at least one target used vehicle record individually include at least two items selected from the group consisting of vehicle type, model, series, trim level, engine type, transmission type, moon roof equipped, leather interior, interior color, and exterior color.

5. The method of claim 3, wherein the resale information includes resale price and resale region.

6. The method of claim 5, wherein the at least one constraint includes a constraint selected from the group consisting of the pair of vehicles are the same model, the pair of vehicles are the same series, the pair of vehicles have the same model year, the pair of vehicles are the same vehicle series, the difference in mileage between the pair of vehicles is less than about 3,000 miles.

7. The method of claim 6, wherein the at least one used vehicle record further comprises resale information.

8. The method of claim 7, wherein the resale information includes at least one item selected from the group consisting of intended resale date and region.

9. A computer-implemented method for estimating market value of a used vehicle, the method comprising:
    A) electronically receiving data from a nearest neighbor database consisting of a number K of used vehicle nearest neighbor records, each used vehicle nearest neighbor record comprising resale information and a plurality of used vehicle features, at least one target used vehicle record comprised of a plurality of used vehicle features, at least one constraint for determining a neighbor relationship between a pair of used vehicles, and a neighborhood distance function for determining a distance between a pair of used vehicles, the number K is iteratively selected for estimation accuracy based on a historical database of N used vehicle records; and
    B) electronically determining an estimated value for the at least one target used vehicle based on the data from the nearest neighbor database, the at least one target used vehicle record, the at least one constraint, and the neighborhood distance function,
    wherein the determining step includes the use of neural networks, and wherein the estimated value of the at least one target used vehicle is relied upon by individuals to at least price used vehicles for resale.

10. A computer-implemented method for estimating market value of a used vehicle, the method comprising:
A) electronically receiving data which includes:
$V_1$ comprised of a number N of $v_1$, each $v_1$ comprising resale information and $f_1$, $V_2$ comprised of at least one $v_2$, each $v_2$ comprised of $f_2$, Const, $F_d$, K, and $Error_P$;
B) determining an $Error_K$ based on $V_1$, Const, $F_d$, and K; and
C) if $Error_K$ is less than about $Error_P$, then
C1) electronically determining an estimated value for each $v_2$ in $V_2$ based on $V_1$, $V_2$, Const, $F_d$, and K;
C2) setting K to K plus 1 and $Error_P$ to $Error_K$; and
C3) looping to step B),
wherein:
$V_1$ equals data from a historical database comprised of a number N of used vehicle records,
$v_1$ equals a used vehicle record in $V_1$,
$f_1$ equals a plurality of vehicle features of $v_1$,
$V_2$ equals a data set comprised of at least one target used vehicle record,
$v_2$ equals a target used vehicle record,
$f_2$ equals a plurality of vehicle features of $v_2$,
Const equals an at least one constraint for determining a neighbor relationship between a pair of used vehicles,
$F_d$ equals a neighborhood distance function for determining a distance between a pair of used vehicles,
K equals a nearest neighbor value,
$Error_P$ equals a previous estimation error, and
$Error_K$ equals a used vehicle market error,
wherein the estimated value of each $v_2$ in $V_2$ is relied upon by individuals to at least price used vehicles for resale.

11. The method of claim 10, wherein the resale information includes at least one item selected from the group consisting of resale date, region, mileage, condition, and resale price.

12. The method of claim 10 wherein step B) is comprised of:
B1) for each $v_i$ in $V_1$,
B11) determining a neighbor group V' of K used vehicles v' for v from $V_1$ based on Const, $F_d$, and $f_1$;
B12) for each v' in V', determining a weighted estimated value for $v_1$ based on v', $f_1$ and $F_d$;
B13) determining an estimated value for $v_1$ based on each weighted estimated value of $v_1$;
B14) determining an estimated error for $v_1$ based on the estimated value for $v_1$ and the resale price of $v_1$; and
B2) determining $Error_K$ based on the estimated error for each $v_1$ in $V_1$, and N.

13. The method of claim 10 wherein step C1) is comprised of:
for each $v_2$ in $V_2$,
C11) determining a nearest neighbor group V" of K used vehicles v" for $v_2$ from $V_1$ based on Const, $F_d$, $f_1$, and $f_2$;
C12) for each v" in V", determining a weighted estimated value for $v_2$ based on v", $F_d$, $f_1$, and $f_2$;
C13) determining an estimated value for $v_2$ based on each weighted estimated values of $v_2$.

14. The method of claim 13 further comprising C14) storing $v_2$ with the estimated value for $v_2$ in a data set $V_3$ of used vehicles $v_3$ with estimated market values.

15. The method of claim 10, wherein $f_1$, and $f_2$ include at least two items selected from the group consisting of vehicle type, model, series, trim level, engine type, transmission type, moon roof equipped, leather interior, interior color, and exterior color.

16. The method of claim 15, wherein Const includes a constraint selected from the group consisting of the pair of vehicles are the same model, the pair of vehicles are the same series, the pair of vehicles have the same model year, the pair of vehicles are the same vehicle series, the difference in mileage between the pair of vehicles is less than about 3,000 miles.

17. The method of claim 16, wherein each $v_2$ further comprises planned resale information, wherein the planned resale information includes at least one item selected from the group consisting of intended resale date, region and resale channel.

18. The method of claim 10, wherein the determining step C1) includes the use of neural networks.

* * * * *